(12) United States Patent
Ohki

(10) Patent No.: US 12,441,174 B2
(45) Date of Patent: Oct. 14, 2025

(54) MOUNT STRUCTURE OF INTERNAL COMBUSTION ENGINE

(71) Applicant: TOYOTA JIDOSHA KABUSHIKI KAISHA, Toyota (JP)

(72) Inventor: Kae Ohki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 285 days.

(21) Appl. No.: 18/451,444

(22) Filed: Aug. 17, 2023

(65) Prior Publication Data

US 2024/0190233 A1 Jun. 13, 2024

(30) Foreign Application Priority Data

Dec. 8, 2022 (JP) ................... 2022-196363

(51) Int. Cl.
*B60K 5/12* (2006.01)
(52) U.S. Cl.
CPC ...................... *B60K 5/12* (2013.01)
(58) Field of Classification Search
CPC ....................................................... B60K 5/12
See application file for complete search history.

(56) References Cited

U.S. PATENT DOCUMENTS

| | | | | |
|---|---|---|---|---|
| 5,570,757 A * | 11/1996 | Courtwright | ............ | B60K 5/12 180/291 |
| 10,576,813 B2 * | 3/2020 | Avina Flores | ............ | F16F 7/116 |
| 2003/0062211 A1 * | 4/2003 | Tsuruda | ................... | F02B 67/06 180/291 |
| 2015/0345583 A1 * | 12/2015 | Ishikawa | .............. | B60K 5/1208 267/141 |
| 2019/0143799 A1 * | 5/2019 | Murakami | ........... | B60K 5/1208 248/638 |

FOREIGN PATENT DOCUMENTS

JP 2008-303916 A 12/2008

* cited by examiner

*Primary Examiner* — Edwin A Young
(74) *Attorney, Agent, or Firm* — SoraIP, Inc.

(57) ABSTRACT

A mount structure of an internal combustion engine includes a first mount bracket fastened to an internal combustion engine at a first fastening position and a second fastening position, and a second mount bracket fixed to a mount attached to a vehicle body on which the internal combustion engine is mounted and fastened so as to overlap the first mount bracket at a third fastening position and a fourth fastening position that are separated from each other by an interval between the first fastening position and the second fastening position.

5 Claims, 6 Drawing Sheets

MOUNT STRUCTURE OF INTERNAL COMBUSTION ENGINE

CROSS-REFERENCE TO RELATED APPLICATION

This application claims priority to Japanese Patent Application No. 2022-196363 filed on Dec. 8, 2022, incorporated herein by reference in its entirety.

BACKGROUND

1. Technical Field

The present disclosure relates to a mount structure of an internal combustion engine.

2. Description of Related Art

For example, as described in Japanese Unexamined Patent Application Publication No. 2008-303916 (JP 2008-303916 A), a mount device is provided between an engine and a vehicle body in order to reduce vibration and noise of the engine.

SUMMARY

However, depending on the degree of acceleration and deceleration of a vehicle, there is a possibility that stress is concentrated due to G applied to the vehicle body being transmitted to the engine via a mount and a mount bracket.

The present disclosure has been made in view of the above issue, and an object of the present disclosure is to provide a mount structure of an internal combustion engine capable of suppressing concentration of stress on the internal combustion engine due to acceleration and deceleration of a vehicle.

A mount structure of an internal combustion engine according to an aspect of the present disclosure includes a first mount bracket fastened to the internal combustion engine in a first fastening position and a second fastening position, and a second mount bracket that is fixed to a mount attached to a vehicle body on which the internal combustion engine is mounted, and that is fastened so as to overlap the first mount bracket at a third fastening position and a fourth fastening position that are farther away from each other than an interval between the first fastening position and the second fastening position.

In the above mount structure, the first mount bracket may include a plate portion provided with the first fastening position and the second fastening position and extending in a predetermined direction, and a pair of columnar fastening portions, each of the columnar fastening portions extending from corresponding one of ends of the plate portion in the predetermined direction to the second mount bracket side and fastened to the second mount bracket.

In the above mount structure, the second mount bracket may be fastened to the internal combustion engine at a fifth fastening position and a sixth fastening position that are farther away from each other than the interval between the first fastening position and the second fastening position.

In the above mount structure, the second mount bracket may include, in a front view of the first mount bracket and the second mount bracket along a fastening direction of the second mount bracket with respect to the first mount bracket, a substantially rectangular base portion in which the third fastening position, the fourth fastening position, the fifth fastening position, and the sixth fastening position are disposed at four corners, and a fixing portion that is extending from between the third fastening position and the fourth fastening position and of which a tip is fixed to the mount.

In the above mount structure, the base portion may include two penetrating portions penetrating in the fastening direction, and an extension portion partitioning the two penetrating portions and extending from between the third fastening position and the fourth fastening position to between the fifth fastening position and the sixth fastening position.

According to the present disclosure, it is possible to suppress concentration of stress on an internal combustion engine due to acceleration and deceleration of a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
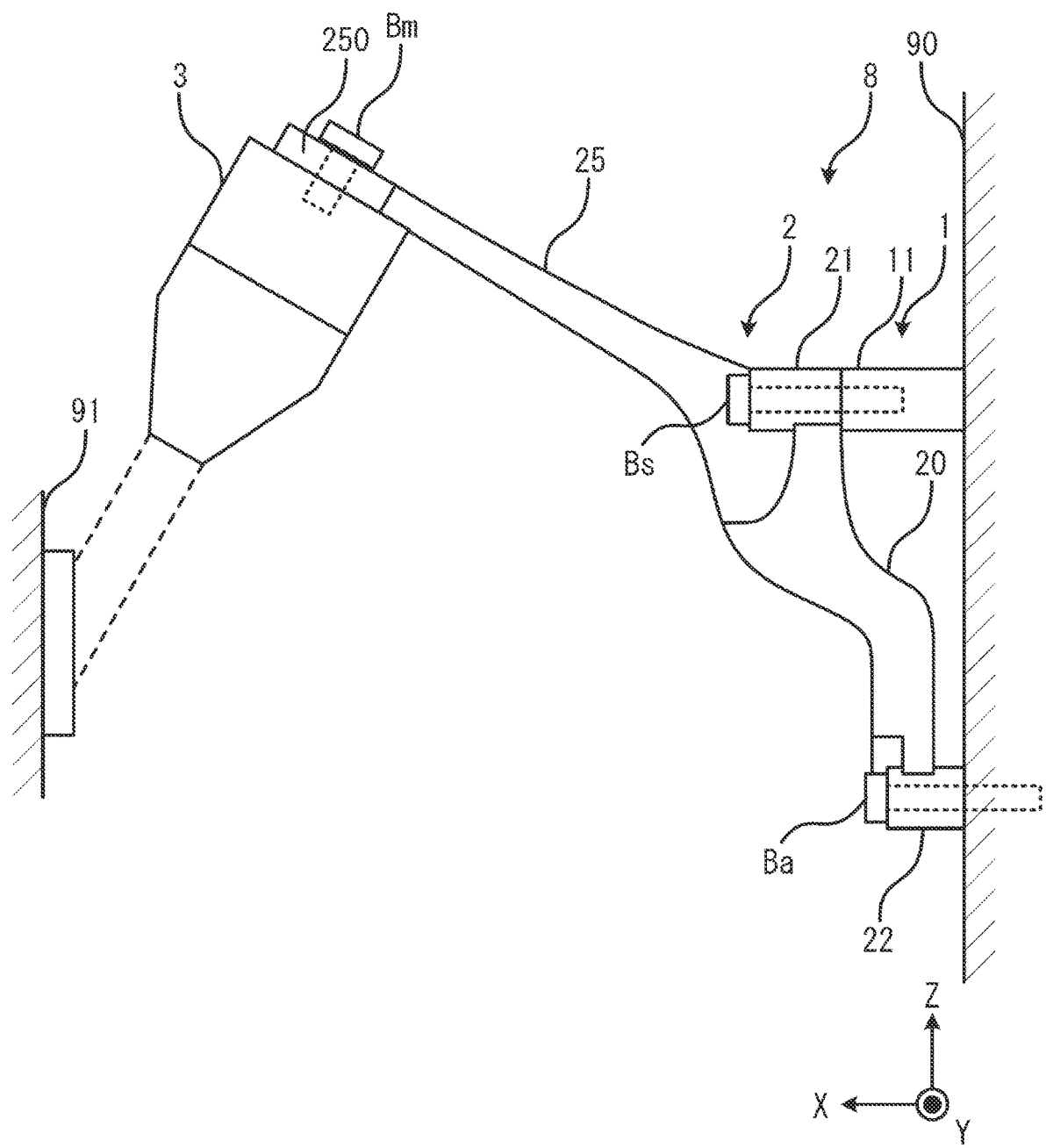
FIG. 1 is a side view illustrating an example of a mounting structure of an engine.
Figure 2:
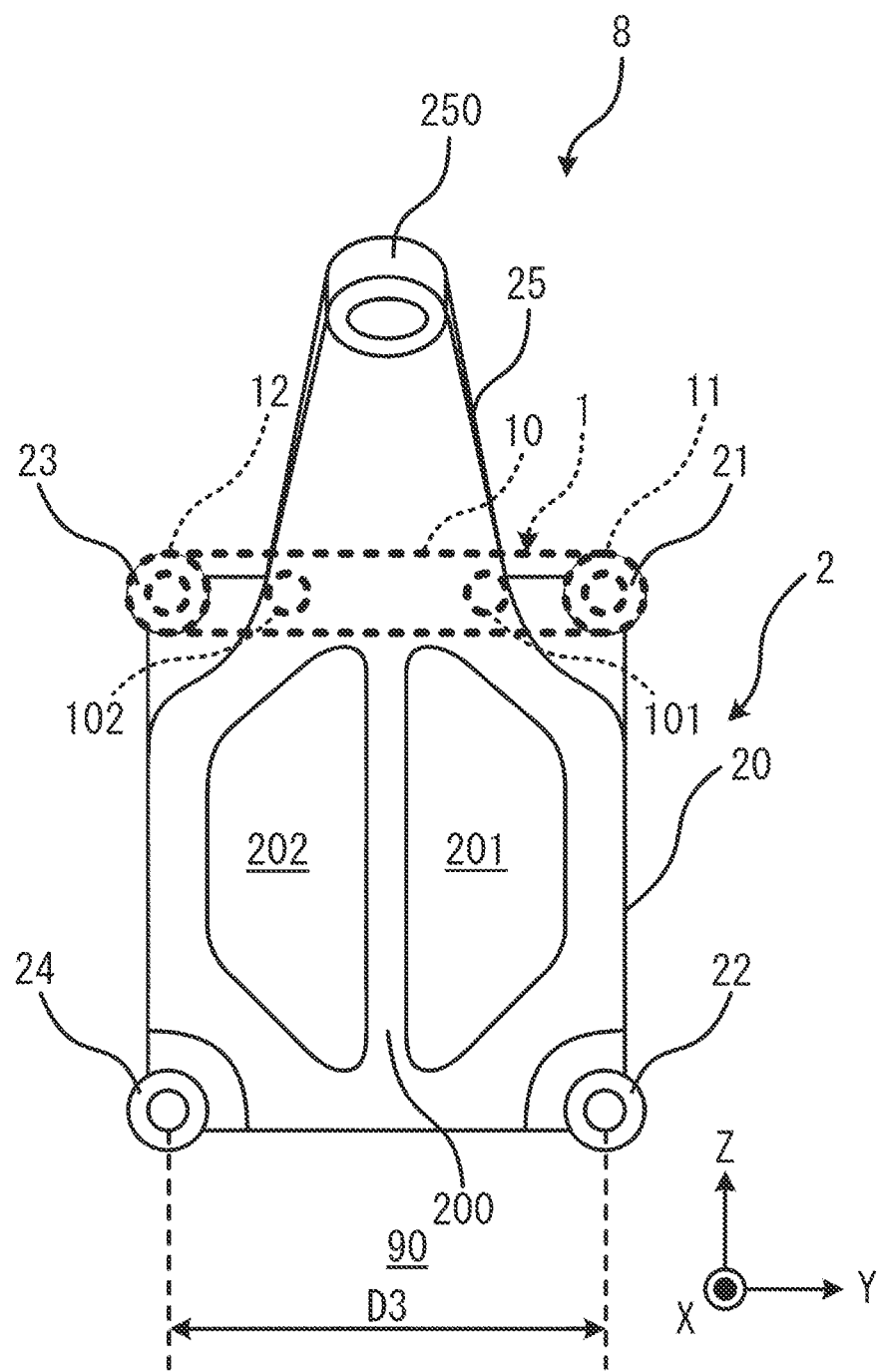
FIG. 2 is a front view illustrating an example of a mounting structure of an engine.
Figure 3:
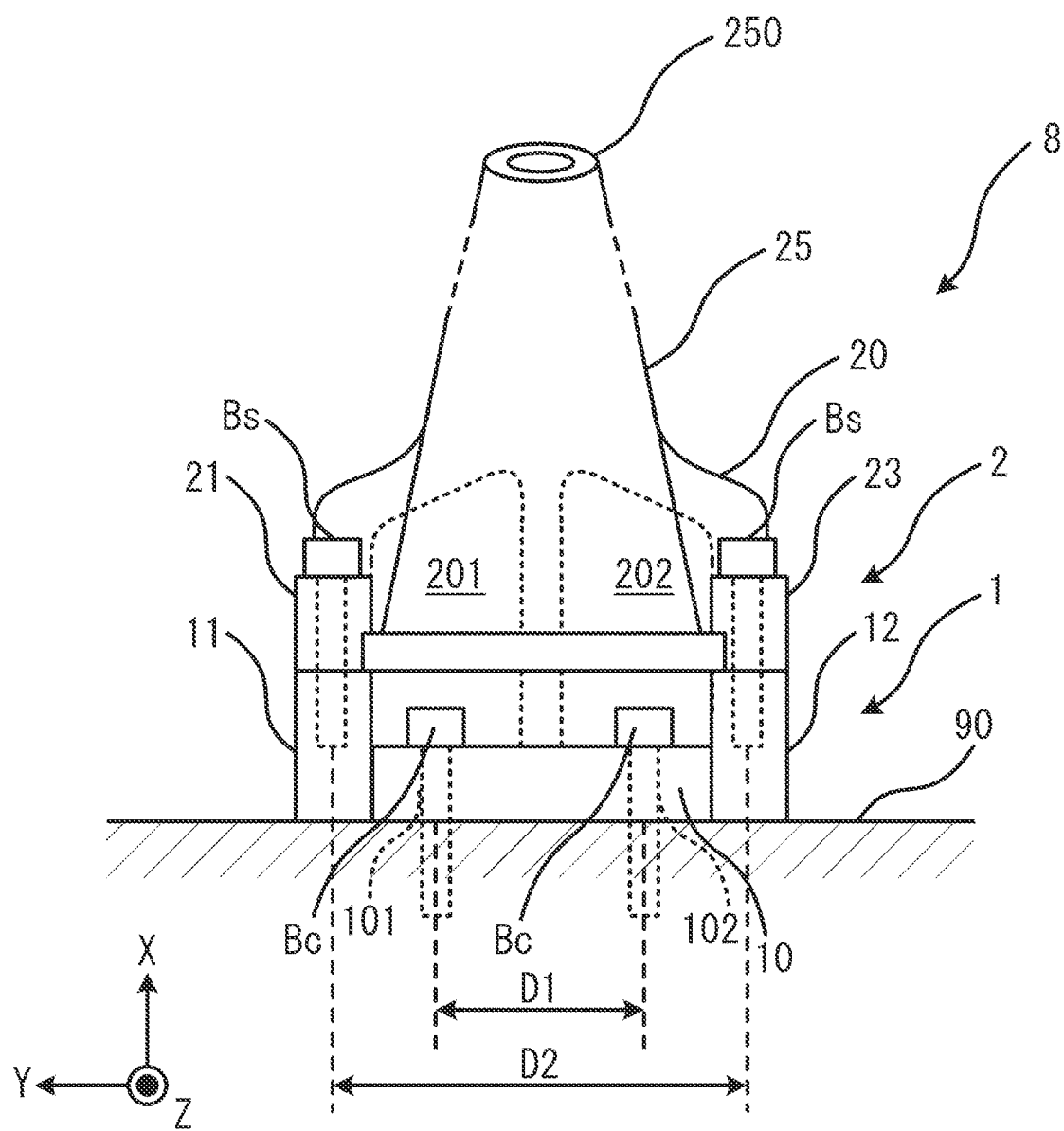
FIG. 3 is a top view illustrating an example of a mounting structure of an engine.

FIG. 1 is a side view illustrating an example of a mount structure 8 of an engine 90. FIG. 2 is a front view illustrating an example of the mount structure 8 of the engine 90. FIG. 3 is a top view illustrating an example of the mount structure 8 of the engine 90. The engine 90 is an example of an internal combustion engine. FIGS. 1 to 3 partially show the lower part of the cylinder block of the engine 90.

The mount structure 8 includes a mount 3, a lower mount bracket 1, and an upper mount bracket 2. The mount 3 is formed of rubber or the like, and is attached to a vehicle body 91 on which the engine 90 is mounted. The mount 3 reduces vibration of the engine 90.

The lower mount bracket 1 is an example of a first mount bracket, and the upper mount bracket 2 is an example of a second mount bracket. The lower mount bracket 1 and the upper mount bracket 2 are formed of, for example, cast iron, and are fastened to the engine 90. The fixing portion 25 of the upper mount bracket 2 is fixed to the mount 3. In FIG. 2, the lower mount bracket 1 is indicated by a dotted line for convenience. The fastening portion of the engine 90 to which the lower mount bracket 1 and the upper mount bracket 2 are fastened is formed by, for example, aluminum die casting.

In the present example, the X direction, the Y direction, and the Z direction orthogonal to each other are defined. The X direction is the left-right direction of the vehicle equipped with the engine 90, the Y direction is the front-rear direction of the vehicle, and the Z direction is the up-down direction of the vehicle. The X direction is a direction in which the lower mount bracket 1 and the upper mount bracket 2 are fastened to the engine 90. The lower mount bracket 1 is directly fastened to the engine 90, and a part of the upper mount bracket 2 is fastened to the engine 90 via the lower mount bracket 1.

Figure 4:
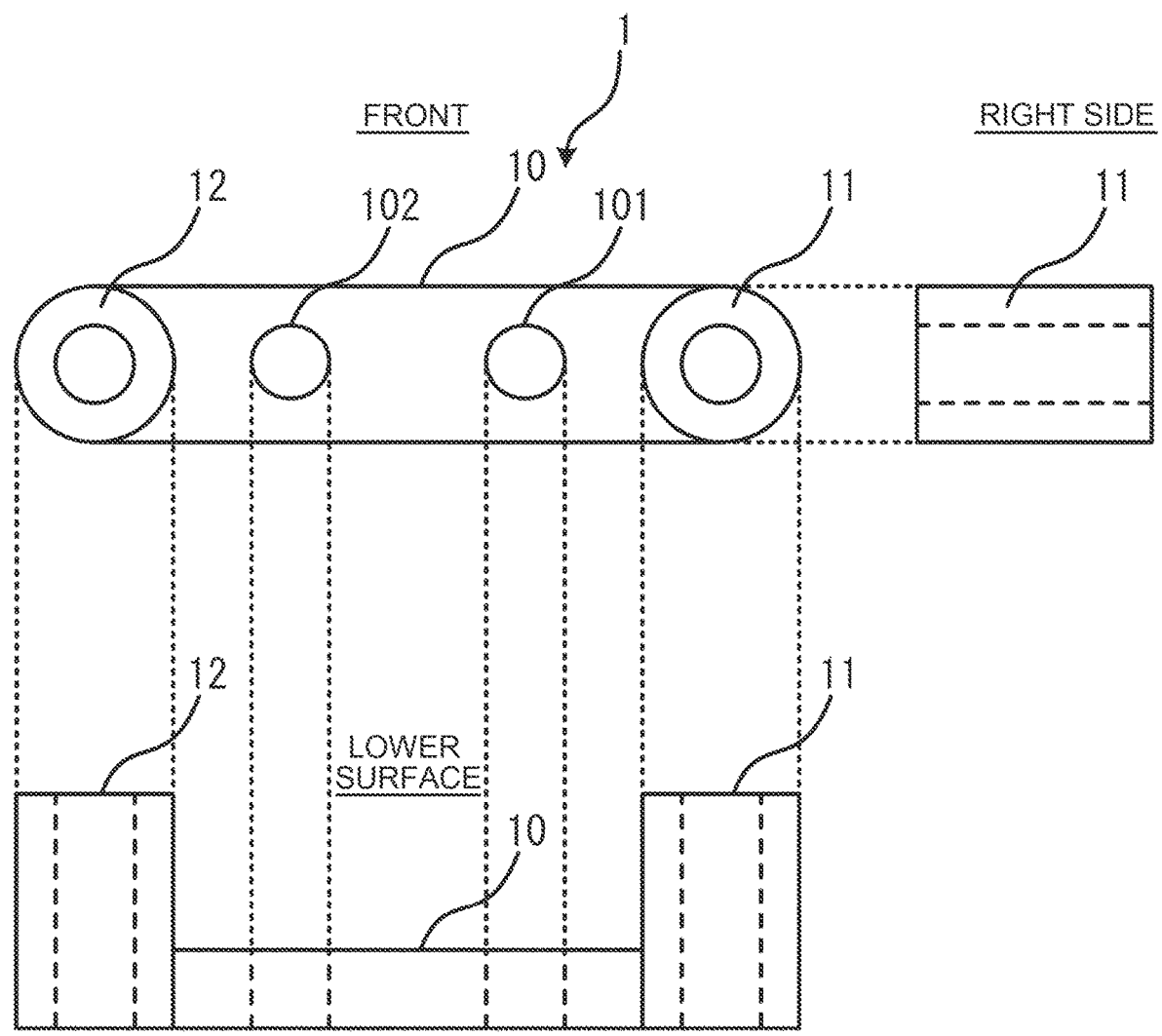
FIG. 4 is a plan view illustrating an example of a lower mount bracket.
Figure 5:
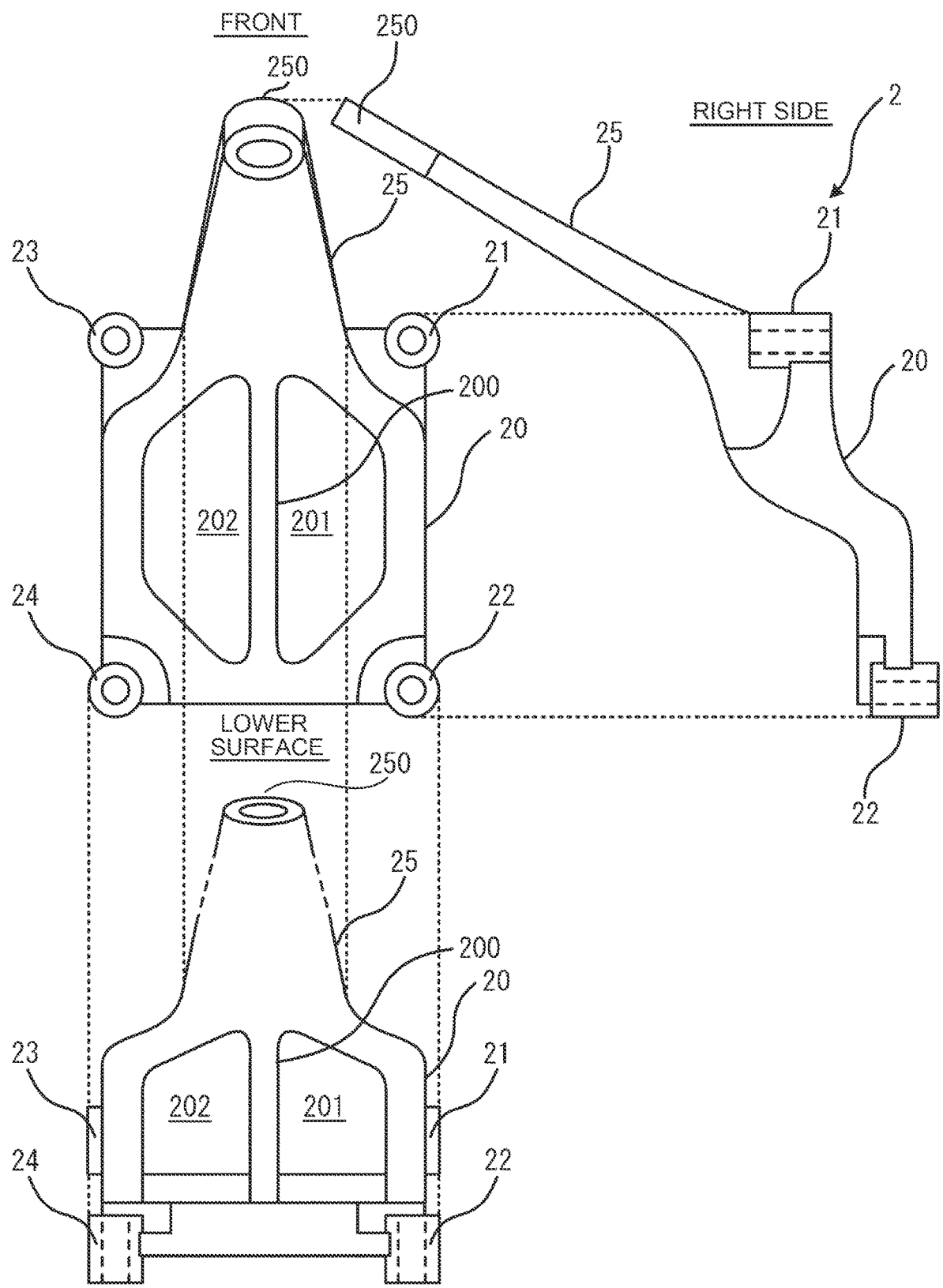
FIG. 5 is a plan view of an exemplary upper mount bracket.

FIG. 4 is a plan view showing an example of the lower mount bracket 1, and FIG. 5 is a plan view showing an example of the upper mount bracket 2. FIG. 4 shows a front surface of the lower mount bracket 1 in the fastening direction, a lower surface in the up-down direction, and a right side surface in the left-right direction. The lower mount bracket 1 has a substantially rectangular plate portion 10 having a long side in the Y direction, and columnar fastening portions 11, 12 extending from both ends of the plate portion 10 in the Y direction.

The plate portion 10 extends in the front-rear direction. In the center of the plate portion 10, a pair of fastening holes 101, 102 for fastening to the engine 90 are arranged side by side in the front-rear direction. The fastening hole 101, 102 is formed to be threadedly engaged with the bolt Bc, and as shown in FIG. 3, the lower mount bracket 1 is fastened to the engine 90 in the fastening hole 101, 102. At this time, the plate surface of the plate portion 10 is in contact with the surface of the engine 90 in a state of facing the surface. In the lower mount bracket 1, the positions of the pair of fastening holes 101, 102 are examples of the first fastening position and the second fastening position, respectively.

Further, the fastening portions 11, 12 have substantially cylindrical shapes extending toward the upper mount bracket 2, and holes threadedly engaged with the bolt Bs are provided inside the fastening portions. In the left-right direction, the fastening portions 11, 12 protrude from the plate surface of the plate portion 10. The fastening portions 11, 12 are fastened to the upper mount bracket 2 by bolt Bs. As shown in FIG. 2, in a front view in the fastening direction, the fastening hole 101, 102 is provided between the fastening portions 11, 12. Specifically, in the front-rear direction, the fastening holes 101, 102 are arranged so as to be substantially linearly aligned with the fastening portions 11, 12.

FIG. 5 is a plan view illustrating an example of the upper mount bracket 2. FIG. 5 shows a front surface of the upper mount bracket 2 in the fastening direction, a lower surface in the up-down direction, and a right side surface in the left-right direction. The upper mount bracket 2 has a base portion 20 having a substantially rectangular shape in a front view, and a fixing portion 25 extending from an upper end portion of the base portion 20. Four fastening portions 21 to 24 are provided at four corners of the base portion 20. The fastening portion 21 is adjacent to the fastening portions 23, 22, and the fastening portion 24 is adjacent to the fastening portions 22, 23. The fastening portions 21, 23 are fastened to the fastening portions 11, 12 of the lower mount bracket 1, and the fastening portions 22, 24 are fastened to the engine 90.

The fastening portions 21, 23 have a substantially cylindrical shape, and a hole that is screwed with the bolt Bs is provided inside the fastening portion. The upper mount bracket 2 is fastened to the lower mount bracket 1 at the fastening portions 21, 23 by bolt Bs. At this time, the fastening portions 21, 23 overlap with the fastening portions 11, 12 of the lower mount bracket 1, and the bolt Bs is screwed to the fastening portions 11, 12 through the fastening portions 21, 23, respectively. In the upper mount bracket 2, the respective positions of the fastening portions 21, 23 are examples of the third fastening position and the fourth fastening position, respectively.

In addition, the fastening portions 22, 24 have substantially cylindrical shapes, and holes that are screwed with the bolt Ba are provided inside the fastening portions. The upper mount bracket 2 is directly fastened to the engine 90 at the fastening portions 22, 24 by bolt Ba. In the upper mount bracket 2, the respective positions of the fastening portions 22, 24 are examples of the fifth fastening position and the sixth fastening position, respectively.

In the left-right direction, the fastening portions 21, 23 are farther from the surface of the engine 90 than the fastening portions 22, 24 by the height of the fastening portions 11, 12 of the lower mount bracket 1. Therefore, the base portion 20 is curved so as to be separated from the surface of the engine 90 from one side of the fastening portions 22, 24 to another side of the fastening portions 21, 23.

In addition, penetrating portions 201, 202 penetrating in the fastening direction are provided in the center of the base portion 20. For example, each of the penetrating portions 201, 202 has a substantially trapezoidal shape, and each of the lower bottoms is formed to face each other. The penetrating portions 201, 202 are partitioned by the extension portion 200. The extension portion 200 extends from between the fastening portions 21, 23 to between the fastening portions 22, 24. In a front view of the fastening direction, the extension portion 200 is provided along the vertical direction.

The fixing portion 25 extends from between the fastening portions 22, 24 in an oblique direction with respect to the surface of the engine 90. The fixing portion 25 is a plate-shaped member that is formed so as to have a narrower width in the left-right direction toward the distal end thereof. A fastening portion 250 for fastening to the mount 3 is provided at a distal end of the fixing portion 25. The fastening portion 250 is provided with a hole to be screwed with the bolt Bm.

Figure 6:
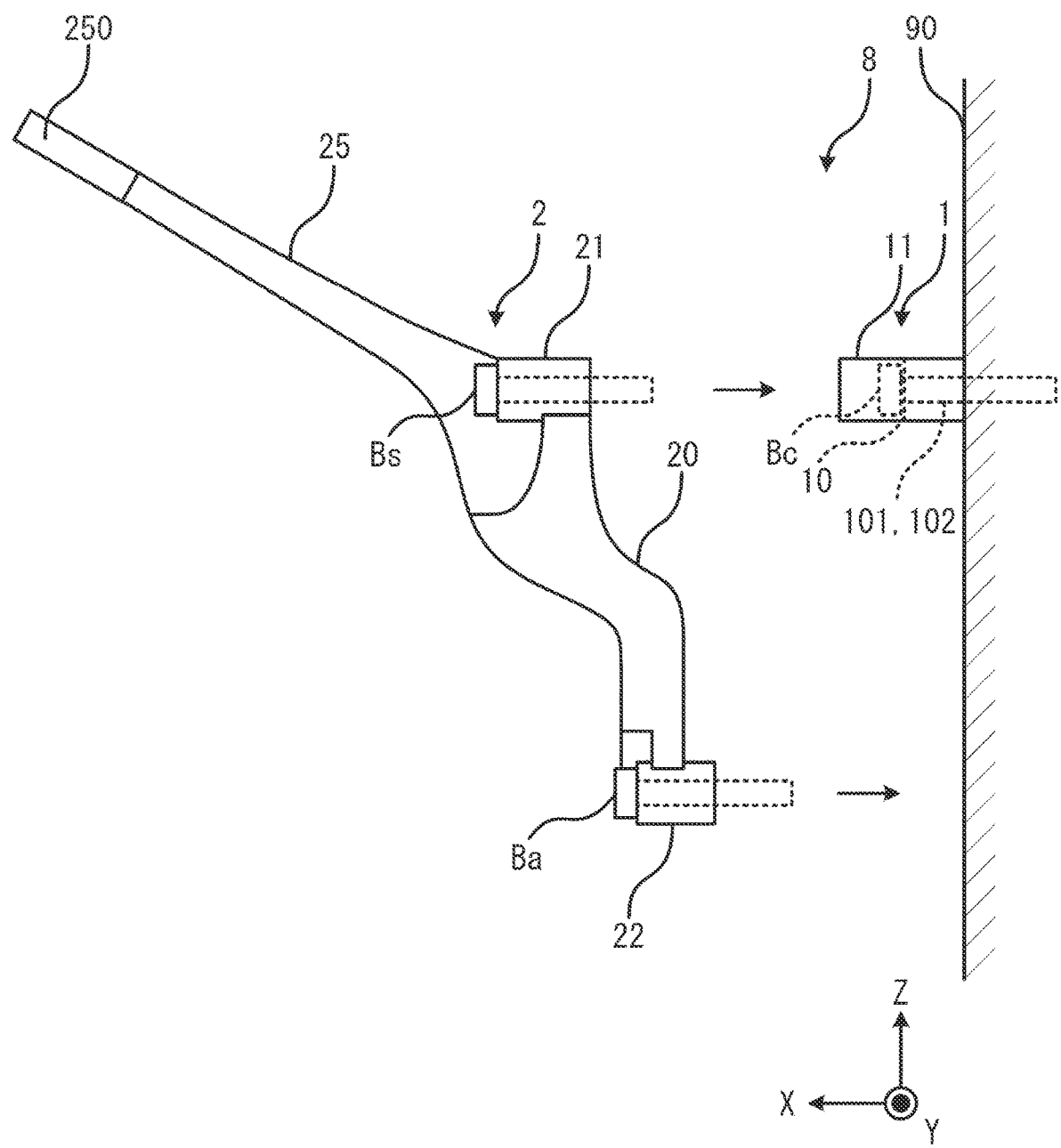
FIG. 6 is a side view illustrating an example of fastening the upper mount bracket to the lower mount bracket fastened to the engine.

FIG. 6 is a side view showing an example of how the upper mount bracket 2 is fastened to the lower mount bracket 1 fastened to the engine 90. First, the lower mount bracket 1 is fastened to the engine 90 by bolt Bc in the fastening holes 101, 102.

Next, the upper mount bracket 2 is fastened to the engine 90 from above the lower mount bracket 1. The upper fastening portion 21 (23) is fastened to the fastening portion 11 (12) of the lower mount bracket 1 by bolt Bs. The lower fastening portion 22 (24) is fastened to the engine 90 by bolt Ba. As described above, the upper mount bracket 2 is fastened to the engine 90 in a state in which the upper region is superimposed on the lower mount bracket 1.

As shown in FIG. 3, an interval D2 between the fastening portions 21, 23 of the upper mount bracket 2 in the front-rear direction is larger than an interval D1 between the fastening holes 101, 102 of the lower mount bracket 1 in the front-rear direction. That is, the fastening positions of the fastening portions 21, 23 are separated from each other by the interval D1 between the fastening positions of the fastening holes 101, 102.

Therefore, when G is applied to the vehicle body 91 due to acceleration and deceleration of the vehicle, the lower mount bracket 1 and the upper mount bracket 2 tend to be formed in the front-rear direction, and G is reduced as compared with a case where the engine 90 and the mount 3 are coupled only by the lower mount bracket 1. Therefore, the concentration of stress on the engine 90 is suppressed.

Further, the lower mount bracket 1 has a plate portion 10 and fastening portions 11, 12 having a substantially circular shape. The plate portion 10 extends in the front-rear direction, and the fastening portions 11, 12 extend from both ends of the plate portion 10 toward the upper mount bracket 2 and are fastened to the upper mount bracket 2. Therefore, the fastening portions 11, 12 are formed on both sides of the plate portion 10 extending in the front-rear direction, so that the G of the vehicle body 91 can be absorbed. Note that the shape of the fastening portions 11, 12 is not limited to a substantially circular shape, and may be a prismatic shape. The lengths of the fastening portions 11, 12 in the left-right direction are appropriately determined in accordance with the designs of the engine 90, the mount 3, and the like. Further, since the interval D1 of the fastening holes 101, 102 can be made narrower than the interval D2 of the fastening portions 11, 12, the lower mount bracket 1 can be easily fastened to the engine 90 even when the fastening area is small, for example, the engine 90 of three cylinders.

Further, the upper mount bracket 2 is fastened to the engine 90 at the fastening portions 22, 24 that are separated from each other by the interval D1 between the fastening holes 101, 102 of the lower mount bracket 1. That is, an interval D3 between the fastening portions 22, 24 shown in FIG. 2 is wider than the interval D1 between the fastening holes 101, 102. Therefore, the fastening of the upper mount bracket 2 to the engine 90 is stabilized as compared with the case where the fastening is performed only by the fastening portions 21, 23, and the formation of the upper mount bracket 2 is also stabilized.

Further, the upper mount bracket 2 has a base portion 20 and a fixing portion 25. The base portion 20 has a substantially rectangular shape in which the fastening portions 21 to 24 are arranged at four corners in a front view along the fastening direction with respect to the lower mount bracket 1. The fixing portion 25 extends from between the fastening portions 21, 23, and has a distal end fixed to the mount 3. Therefore, as compared with the case where the fixing portion 25 extends from the other portion, the G of the vehicle body 91 is easily transmitted from the mount 3 to the fastening portions 21, 23, and the stress is easily relieved by the formation of the upper mount bracket 2 and the lower mount bracket 1.

The base portion 20 includes the penetrating portions 201, 202 and the extension portion 200. The penetrating portions 201, 202 penetrate in the fastening direction. The extension portion 200 partitions the penetrating portions 201, 202 and extends from between the fastening portions 21, 23 to between the fastening portions 22, 24. Therefore, compared to the case where the penetrating portions 201, 202 and the extension portion 200 are not provided, the weight of the upper mount bracket 2 is reduced and the upper mount bracket 2 is easily formed.

The above-described embodiments are preferred embodiments of the present disclosure. However, the present disclosure is not limited thereto, and various modifications can be made without departing from the gist of the present disclosure.

What is claimed is:

1. A mount structure of an internal combustion engine, the mount structure comprising:
 a first mount bracket fastened to the internal combustion engine in a first fastening position and a second fastening position; and
 a second mount bracket that is fixed to a mount attached to a vehicle body on which the internal combustion engine is mounted, and that is fastened so as to overlap the first mount bracket at a third fastening position and a fourth fastening position that are farther away from each other than an interval between the first fastening position and the second fastening position.

2. The mount structure according to claim 1, wherein the first mount bracket includes a plate portion provided with the first fastening position and the second fastening position and extending in a predetermined direction, and a pair of columnar fastening portions, each of the columnar fastening portions extending from corresponding one of ends of the plate portion in the predetermined direction to the second mount bracket side and fastened to the second mount bracket.

3. The mount structure according to claim 1, wherein the second mount bracket is fastened to the internal combustion engine at a fifth fastening position and a sixth fastening position that are farther away from each other than the interval between the first fastening position and the second fastening position.

4. The mount structure according to claim 3, wherein the second mount bracket includes, in a front view of the first mount bracket and the second mount bracket along a fastening direction of the second mount bracket with respect to the first mount bracket, a substantially rectangular base portion in which the third fastening position, the fourth fastening position, the fifth fastening position, and the sixth fastening position are disposed at four corners, and a fixing portion that is extending from between the third fastening position and the fourth fastening position and of which a tip is fixed to the mount.

5. The mount structure according to claim 4, wherein the base portion includes two penetrating portions penetrating in the fastening direction, and an extension portion partitioning the two penetrating portions and extending from between the third fastening position and the fourth fastening position to between the fifth fastening position and the sixth fastening position.

* * * * *